United States Patent [19]

Kobayashi et al.

[11] Patent Number: 4,948,218

[45] Date of Patent: Aug. 14, 1990

[54] OPTOELECTRONIC DEVICE FOR AN OPTICAL COMMUNICATION SYSTEM

[75] Inventors: Toyohiro Kobayashi; Shouji Mukohara, both of Shizuoka, Japan

[73] Assignee: Mitsubishi Denki Kabushiki Kaisha, Tokyo, Japan

[21] Appl. No.: 378,976

[22] Filed: Jul. 12, 1989

[30] Foreign Application Priority Data

Jul. 14, 1988 [JP] Japan ................................. 63-175912
Aug. 5, 1988 [JP] Japan ................................. 63-195654

[51] Int. Cl.$^5$ ............................................. G02B 6/28
[52] U.S. Cl. .................................. 350/96.16; 455/608; 455/617
[58] Field of Search ........................ 350/96.16, 96.14; 455/601, 606, 607, 608, 610, 612, 617

[56] References Cited

U.S. PATENT DOCUMENTS

| | | | |
|---|---|---|---|
| 3,883,217 | 5/1975 | Love et al. | 350/96.16 |
| 4,072,399 | 2/1978 | Love | 350/96.16 |
| 4,198,118 | 4/1980 | Porter | 350/96.16 |
| 4,234,970 | 11/1980 | Beasley et al. | 455/607 |
| 4,511,208 | 4/1985 | Ozeki et al. | 350/96.16 |
| 4,671,608 | 6/1987 | Konishi | 350/96.16 |
| 4,727,601 | 2/1988 | Konishi | 455/612 |
| 4,826,275 | 5/1989 | Heinzman | 350/96.16 |

Primary Examiner—Frank Gonzalez
Assistant Examiner—John Ngo
Attorney, Agent, or Firm—Oblon, Spivak, McClelland Maier & Neustadt

[57] ABSTRACT

An optoelectronic device for use in an optical communication system is disclosed. The optoelectronic device, coupling to each other the ports of a plurality (e.g. two or three) of optical data transmission lines, comprises: pass-through optical fibers connecting to each other the ports of the optical data transmission lines; receiving optical fibers connecting such ports to the input of an optical-to-electrical transducer; transmitting optical fibers connecting the output of an electrical-to-optical transducer to the above ports; a pulse width fixing circuit, having an input and an output coupled to the output of the optical-to-electrical transducer and the input of the electrical-to-optical transducer, respectively, for regenerating and amplifying the signal and limiting the pulse width of the regenerated signal to a predetermined fixed length; and a pulse width normalizing circuit (second pulse width fixing circuit) to whose output the input of a terminal electronic data processing device is coupled to receive information from the optical signal transmitted through the optical data transmission lines. The output of the terminal data processing device is supplied to the electrical-to-optical transducer.

10 Claims, 10 Drawing Sheets

FIG. 3
(a)
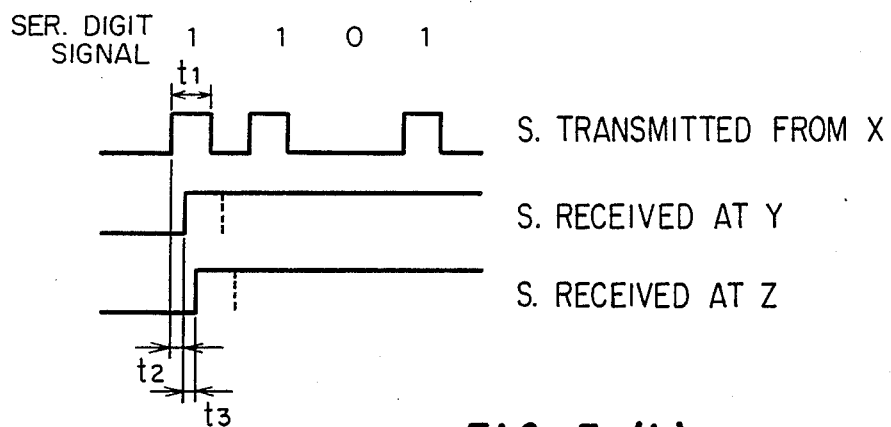
(b)
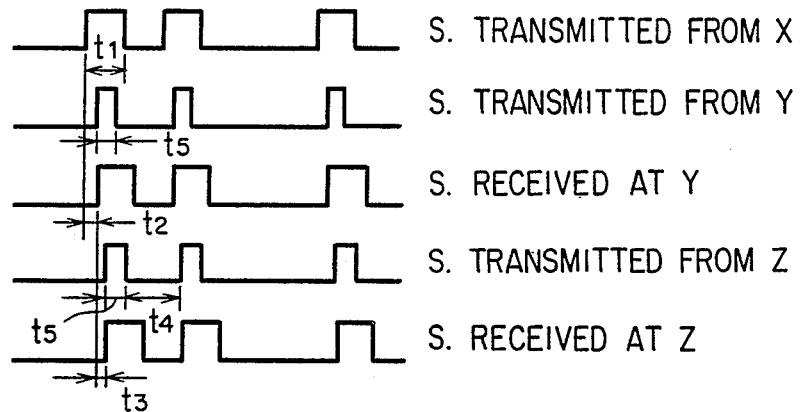
(c)
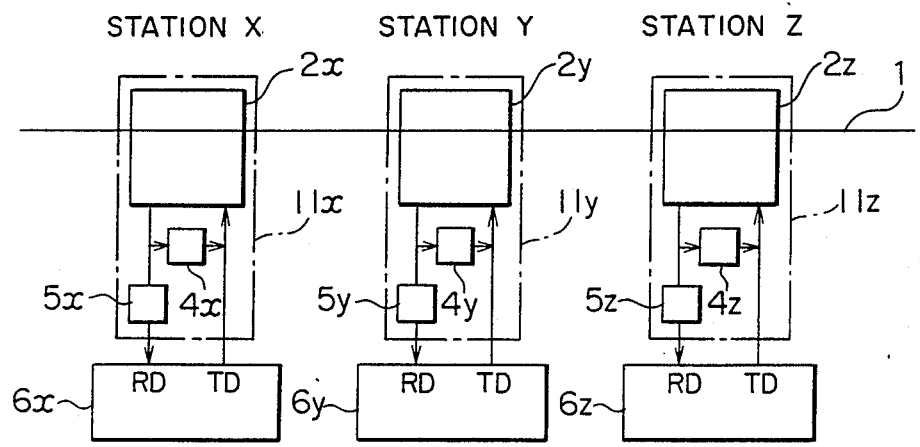

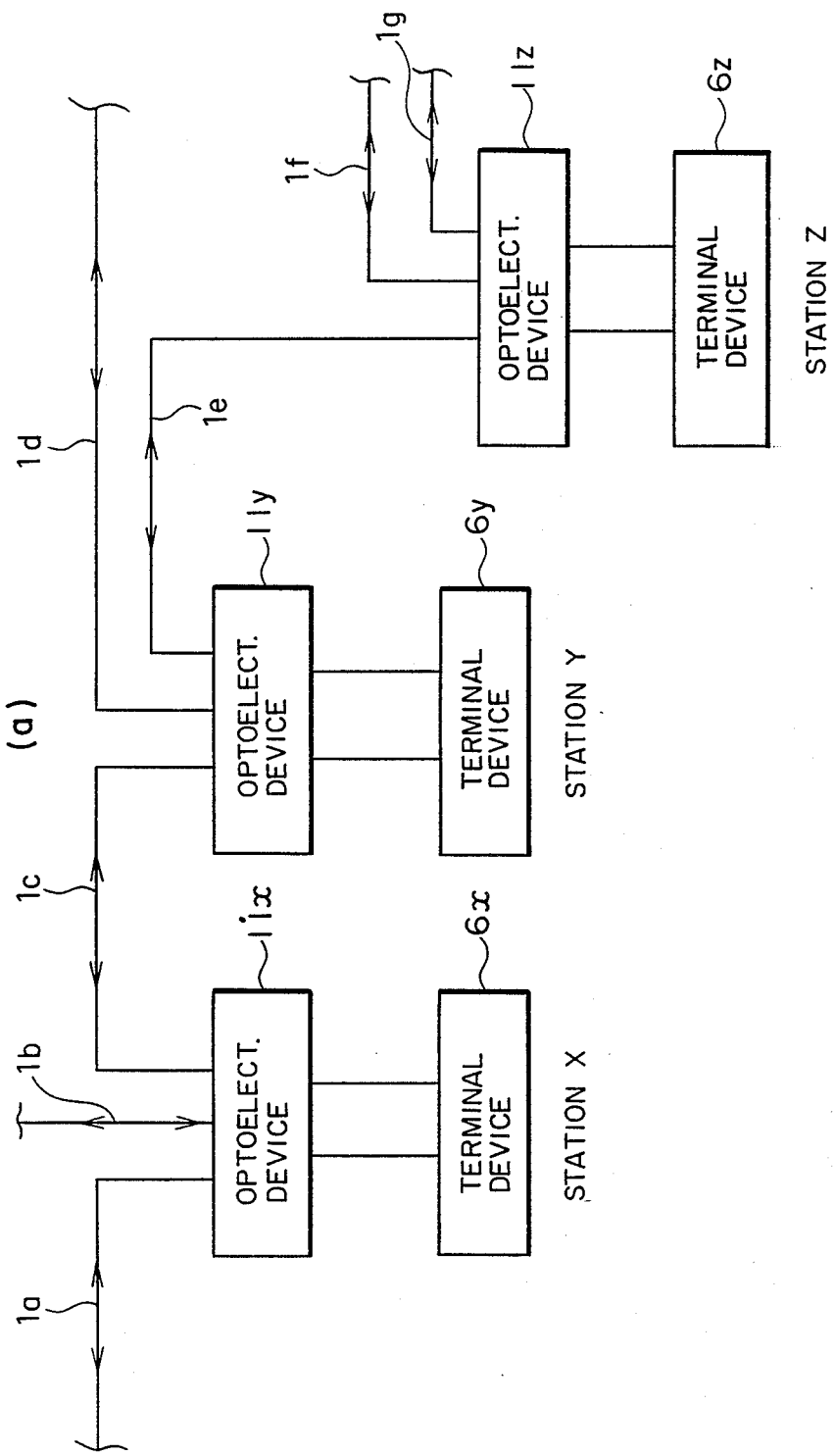

(b)

OPTOELECTRONIC DEVICE FOR AN OPTICAL COMMUNICATION SYSTEM

BACKGROUND OF THE INVENTION

This invention relates to optoelectronic coupling and signal regenerating devices for use in an optical communication system in which data is transmitted through optical data transmission lines; and more particularly, it relates to such optoelectronic coupling and signal-regenerating devices that are especially suited to be used in an optical communication system in which data are transmitted through bidirectional single optical fibers constituting the optical data transmission lines thereof.

Optical fibers are now becoming increasingly common in the field of data transmission, since they offer important advantages over the conventional electrical data transmission lines: they transmit radiant energy of high frequencies and hence are intrinsically capable of transmitting a larger amount of data per single line; further, they are virtually immune to adverse effects of electromagnetic noises.

In optical communication systems utilizing optical fibers as data transmission lines, repeaters may be installed along the transmission lines for the purpose of regenerating data signals and overcoming the attenuation thereof. Let us describe the organization of a typical bidirectional repeater in reference to FIG. 1, which shows diagramatically the organization of a conventional repeater for an optical communication system utilizing bidirectional single optical fibers; this repeater is disclosed, for example, in Japanese Laid Open Patent Application No. 60-49526.

In FIG. 1, the data is transmitted between the terminal stations A and B via the bidirectional single optical fibers 35 and 36 and a repeater 34 disposed therebetween. The repeater 34 comprises a switching unit 30, a monitoring and controlling unit 31, and a reproduction or regenerating unit 32 for amplifying and regenerating the optical signals When the transmission direction of signals is to be changed over, the switching unit 30 is operated by the monitoring and controlling unit 31 in response to a control signal outputted from one of the terminal stations A and 8. Namely, under the usual condition under which the data generated by the terminal station A is transmitted to the terminal station B, the switching unit 30 couples the ports of the optical fibers 35 and 36 to the input and the output of the regenerating unit 32 respectively, as shown in solid lines in the figure; thus, the signal supplied from the optical fiber 35 is amplified and regenerated by the regenerating unit 32 to be transmitted to the terminal station B via the optical fiber 36. When, on the other hand, the data is to be transmitted from the terminal station B to the terminal station A, the terminal station A outputs a change-over control signal; the monitoring and controlling unit 31, which is continuously monitoring the output of the regenerating unit 32, detects the change-over control signal and outputs a change-over command to the switching unit 30. In response thereto, the switching unit 30 is changed over to the coupling state shown by dotted lines in the figure, so that the port of optical fiber 36 is coupled to the input of the regenerating unit 32 and the output of the same unit 32 is coupled to the optical fiber 35. Thus, the signal outputted from the terminal station B is amplified and regenerated by the regenerating unit 32 to be transmitted to the terminal station A. In this manner, the repeater 34 is capable of regenerating signals that are transmitted in both the upward and downward directions, i.e., from terminal station B to terminal station A, and from terminal station A to terminal station B, respectively.

However, the conventional optical communication system utilizing bidirectional single optical fibers as data transmission lines has the following disadvantages. First, the control signal for changing over the switching unit 30 must be transmitted to the repeater 34 from other terminal stations; thus, the transmission of data between the stations requires complicated preliminary steps which reduces the efficiency of data transmission. Second, the repeater 34 must be provided with a monitoring and controlling unit 31; thus, the circuit organization of the repeater becomes complicated and the communication system is thereby made more expensive and large-sized.

The specific organization described above of the conventional repeater is applicable only to the case where the ports of the two data transmission lines are to be connected to each other via the repeater. Thus, the above-mentioned disadvantages are especially serious in the case where more than two ports of the data transmission lines are to be coupled to each other at the locations where the repeaters are to be provided.

SUMMARY OF THE INVENTION

It is a primary object of this invention therefore to provide a device having the function of a repeater in an optical communication system utilizing bidirectional data transmission lines, wherein the device is simple in its organization and in its method of operation, so that the device is rendered small in size, low in cost, and high in efficiency in the transmission of data.

It is a further object of this invention to provide such a device which is capable of receiving and transmitting data from and to any number of data transmission lines, coupling to each other the ports of two, three, or more data transmission lines; for example, in the case where the ports of three data transmission lines are to be coupled to each other, it is an object of this invention to provide a device which is capable of receiving signals from any one of the three ports of the three data transmission lines, of regenerating and amplifying them, and of transmitting them in three directions into all the three data transmission lines.

It is a still further object of this invention to provide such a device which is capable of transmitting the optical signals therethrough even when the regenerating or amplifying function thereof is in failure, so that the optical communication system comprising the devices according to this invention may function properly as a whole even if the regenerating function of some of the devices within the system fails.

It is an additional object of this invention to provide such a device which functions not only as a repeater but also as an interface between a terminal electronic data processing unit and the optical communication system, wherein the same communication protocol as utilized in conventional electrical communication systems in which the data are transmitted through electrical lines may be utilized without any modifications.

It is a still another object of this invention to provide such a device which is especially suited to be used in an optical communication system which utilizes signal. bidirectional optical fibers as its data transmission lines.

The above objects are accomplished according to the principle of this invention in an optoelectronic device for connecting to each other ports of a plurality of bidirectional optical data transmission lines of an optical communication system, wherein the optoelectronic device effects two functions: the function of a pass-through optical coupler, and that of a repeater for regenerating and amplifying the optical signals transmitted from any one of the optical data transmission lines, and for transmitting the regenerated signal to all the data transmission lines; the optical communication system in which the optoelectronic device or devices according to this invention are provided includes signal generator means for generating optical pulse signals that are transmitted through the optical signal transmission lines.

The function of a pass through coupler is effected by a pass through optical coupler means for optically connecting the ports of the plurality of optical transmission lines of the optical communication system to each other wherein the pass through optical coupler means includes optical fiber means connecting said ports of the optical transmission lines to each other. In the case where two ports of two optical data transmission lines are to be connected to each other, a single optical fiber suffices to connect the two ports with each other; where three ports of three data transmission lines, A, B, and C, are to be connected to each other, three optical fibers, each connecting A with B, B with C, and A with C, are necessary.

On the other hand, the regenerating function of the optoelectronic device is effected by an electronic amplifier having the pulse width fixing function, and optical coupler and optoelectronic transducer means for connecting the input and the output of the pulse-width fixing amplifier to the ports of the optical data transmission lines.

Thus, a receiving optical coupler means optically connects the ports of the optical data transmission lines to an input of an optical-to-electrical transducer means, to supply to the optical-to-electrical transducer means the optical pulse signals that are generated by the signal generator means, transmitted through the optical transmission lines, and extracted from the ports of the optical transmission lines; the receiving optical coupler means includes optical fiber means (e.g. two optical fibers each connecting one of the two ports of two optical data transmission lines to the optical-to-electrical transducer, in the case where two optical data transmission lines are to be connected; three optical fibers are necessary in the case where the number of optical data transmission lines to be connected with each other is three) for connecting the ports of the optical data transmission lines to the input of the optical-to-electrical transducer means. The optical-to-electrical transducer means converts optical pulses into corresponding electrical pulses. Further, a first pulse width fixing means (amplifier) having an input and an output electrically coupled respectively to an output of the optical-to-electrical transducer means and to an input of an electrical-to-optical transducer means, produces electrical pulses of a first predetermined fixed width in response to electrical pulses supplied thereto from the optical-to-electrical transducer means, wherein the first predetermined fixed width of the pulses produced by the first pulse width fixing means is smaller than the pulse width of said optical pulse signals that are generated by the signal generator means and transmitted through the optical data transmission lines. The electrical-to-optical transducer means converts the electrical pulses into corresponding optical pulses; further, a transmitting optical coupler means optically connects the output of the electrical-to-optical transducer means to the ports of the optical transmission lines, to supply to and inject into the ports of the optical transmission lines optical pulse signals outputted from the electrical-to-optical transducer means; the transmitting optical coupler means includes optical fiber means connecting the output of the electrical-to-optical transducer means to the ports of the optical transmission lines.

Thus, according to the principle of this invention, the width of the pulses regenerated and outputted from the pulse width fixing means is smaller than that of the original pulse signals generated by the pulse generator means of the optical communication system. Consequently even if an optical communication system is provided with a plurality of optoelectronic devices according to this invention along the optical data transmission lines thereof, adverse effects can be avoided which may result from the reflections of regenerated signals between the optoelectronic devices if the width of the original and regenerated pulse signals are equal.

The second last object mentioned above is accomplished especially in a preferred embodiment of this invention wherein optoelectronic device comprises a terminal electronic data processing device, such as a microcomputer, which receives and transmits data from and to the ports of the optical data transmission lines. Thus, according to this preferred embodiment of this invention, the optoelectronic device further comprises a second pulse width fixing means (pulse width normalizing means) and a terminal electronic data processing means. The second pulse width fixing means, having an input electrically coupled to the output of the optical-to-electrical transducer means, produces electrical pulses of a second predetermined fixed width in response to the electrical pulses supplied thereto The terminal electronic data processing means, having an input and an output electrically coupled, respectively, to the output of the second pulse width fixing means and to the input of the electrical-to-optical transducer means, receives information data that are contained in the optical pulse signals transmitted through the optical data transmission lines, via the electrical pulses supplied thereto from the second pulse width fixing means; further, the terminal electronic data processing means outputs to the electrical-to optical transducer means electrical pulse signals whose pulse width is greater than the first predetermined fixed width. Thus, the terminal electronic data processing means preferrably constitutes a part of the above-mentioned signal generating means of the optical communication system.

In this preferred form of this invention, the data transmission among the terminal electronic data processing means, such as microcomputers, can be effected through optical data transmission lines without any modifications of the communication protocol (i.e. a set of rules defining the way in which the data may flow in a communication system) which has been utilized in conventional electrical communication systems that utilize coaxial cables etc. as its data transmission lines.

The novel features which are believed to be characteristic of this invention are set forth with particularity in the appended claims This invention itself, however, both as to its organization and method of operation, together with further objects and advantages thereof, may be bust understood from the following detailed description of the preferred embodiments taken in conjunction with the accompanying drawings.

BRIEF DESCRIPTION OF THE DRAWINGS

FIGS. 3 shows, together with an optical communication system including a plurality of the optoelectronic devices similar to that of FIG. 2, the actual and imaginary waveforms of the signals generated in the optical communication system, wherein FIG. 3 (a) shows imaginary waveforms which may produced if the width of the regenerated pulses produced by the optoelectronic devices is equal to the width of the original pulses originally produced by one of the terminal electronic devices, (b) shows the waveforms of the signals that are actually generated, and (c) shows the organization of a portion of the optical communication system;

In the drawings, like reference numerals represent like or corresponding parts.

DETAILED DESCRIPTION OF THE PREFERRED EMBODIMENTS

Figure 1:
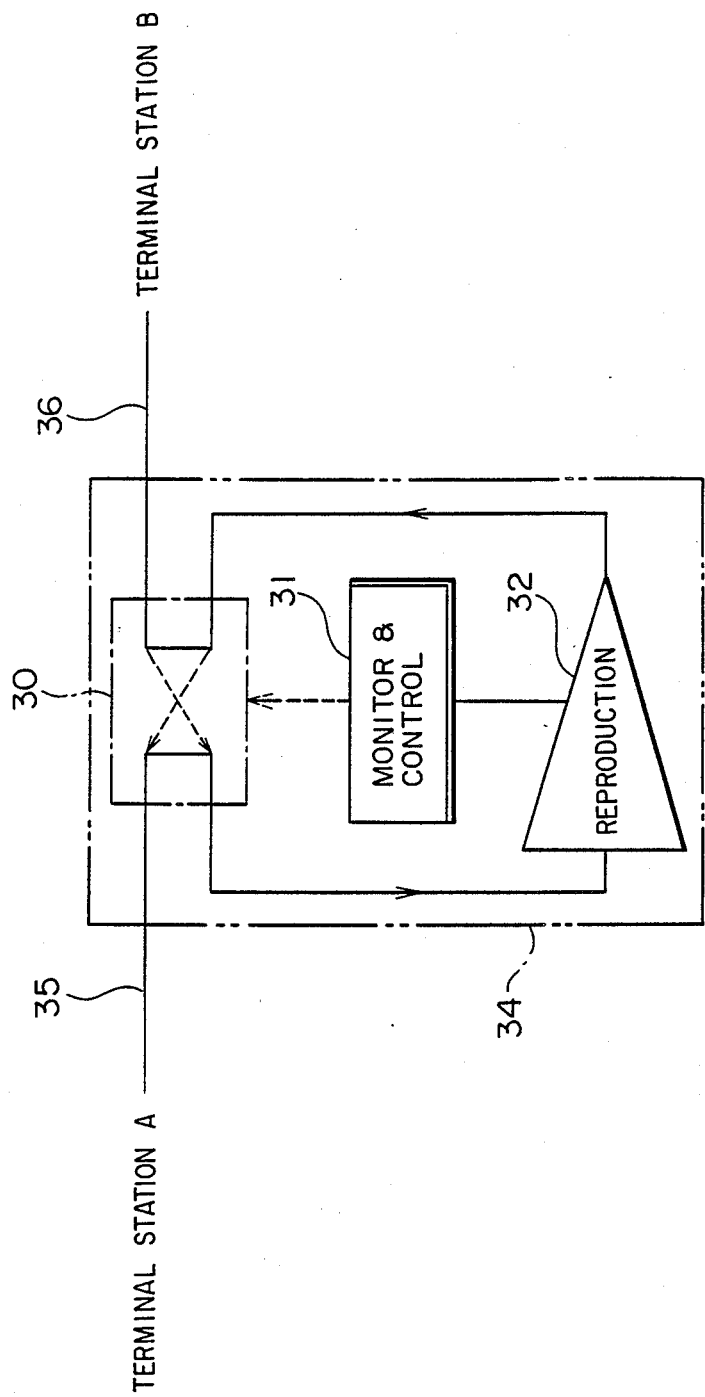
FIG. 1 is a schematic diagram showing the organization of a conventional repeater disposed on a single fiber bidirectional optical data transmission line of an optical communication system.

Referring now to the drawings, the preferred embodiments of this invention are described. In order to make the description simple and easy to comprehend, the two cases wherein the number of the optical data transmission lines that are to be coupled with each other by the optoelectronic device according to this invention is two and three, respectively, are described in detail below.

Figure 2:
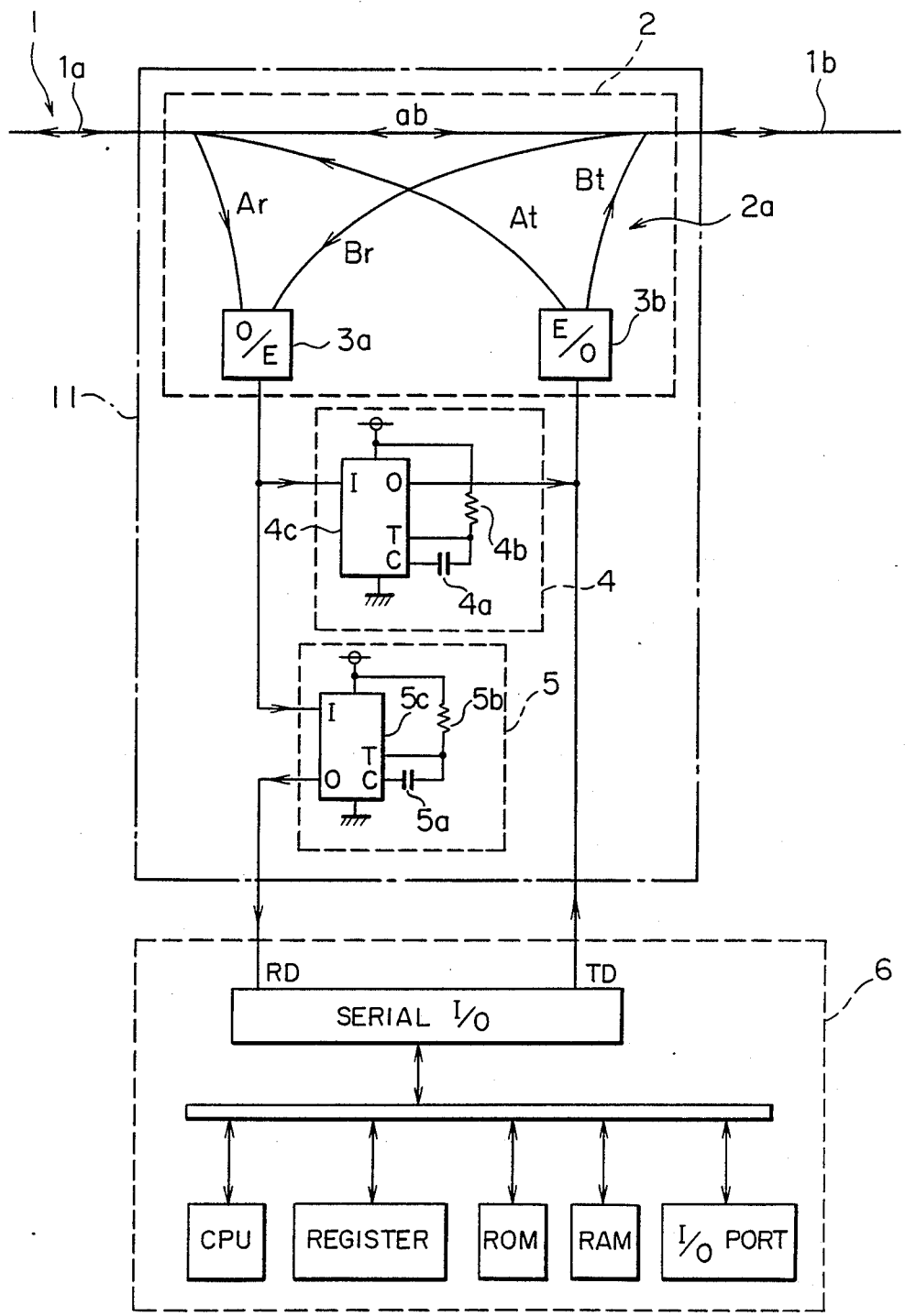
FIG. 2 is a schematic diagram showing the organization of an embodiment of an optoelectronic device according to this invention, wherein the number of the optical data transmission lines that are to be coupled to each other by the optoelectronic device is two.

Referring to FIGS. 2 and 3, let us first describe an embodiment of this invention wherein the number of the optical data transmission lines that are to coupled to each other is two. In FIG. 2, which shows the overall organization of the embodiment, two optical data transmission lines 1a and 1b of the optical data transmission network 1, each of which consist of a single optical fiber, are each coupled to an adjacent optoelectronic device similar to that shown in FIG. 2. The optoelectronic device 11 according to this invention comprises an optoelectronic coupler unit 2, a first pulse width fixing circuit 4 for regenerating the pulse signals, and a second pulse width fixing circuit (pulse width normalizing circuit) 5. A terminal electronic data processing device 6 coupled to the optoelectronic device 11 consists, for example, of a microcomputer.

The optoelectronic coupler unit 2 may be divided into two portions: optical coupler portion 2a consisting of optical fibers ab, Ar, Br, At, and Bt; and optoelectronic transducer portion consisting of optical-to-electrical transducer 3a and electrical-to-optical transducer 3b. The optical coupler portion 2a is organized in the following manner, as shown in the figure: the pass-through optical fiber ab couples the two ports of the two optical data transmission lines 1a and 1b to each other; the two receiving optical fibers Ar and Br for the reception of data connect the ports of the two data transmission lines 1a and 1b, respectively to the input of the optical-to-electrical transducer 3a; and the two transmitting optical fibers At and Bt for transmitting data connect the output of the electrical-to optical transducer 3b to the ports of the two data transmission lines 1a and 1b, respectively. The optical-to-electrical transducer 3a which may comprise, for example a photodiode, converts the optical pulses supplied thereto into corresponding electrical pulses: on the other hand the electrical-to-optical transducer 3b, which may comprise, for example, a light emitting diode, converts the electrical pulses supplied thereto into corresponding optical pulses.

Across the output of the optical-to-electrical transducer 3a and the input of the electrical-to-optical transducer 3b is coupled the first pulse width fixing circuit 4 comprising a monostable multivibrator 4c and a serial circuit of a capacitor 4a and a resistor 4b for determining the output pulse width thereof. When a pulse train is transmitted from other stations (not shown) via the optical data transmission line 1a or 1b, the first pulse width fixing circuit 4 is triggered to a high level in response to the leading edge of each one of the pulses supplied thereto from the optical-to-electrical transducer 3a, to return each time to the low level after a length of time determined by the capacitance and the resistance values of the capacitor 4a and the resistor 4b. Consequently, the pulse width fixing circuit 4 produces pulses of predetermined fixed width in response to electrical pulses supplied thereto from the optical-to-electrical transducer 3a; thus, the first pulse width fixing circuit 4 not only amplifies and regenerates the electrical pulse signals supplied thereto, but also limits to a predetermined fixed value the width of the pulses outputted therefrom to the electrical-to-optical transducer 3b.

The output of the optical-to-electrical transducer 3a is further coupled to the pulse width normalizing circuit (second pulse width fixing circuit) 5, which comprises, as the above described circuit 4, a monostable multivibrator 5c and a serial circuit of a capacitor 5a and a resistor 5b for determining the output pulse width thereof. When a pulse train is transmitted from other stations (not shown) via the line 1a or 1b, the pulse width normalizing circuit 5 is triggered to a high level in response to the leading edge of each one of the pulses supplied thereto from the optical to-electrical transducer 3a, and returns each time to the low level after a length of time determined by the values of the capacitor 5a and the resistor 5b. Thus, it outputs to the input of the terminal electronic data processing device 6 an electrical pulse signal whose pulse width is adjusted to the same value which is utilized in conventional electrical communication systems involving the terminal electronic device 6.

The terminal electronic device 6, which has an input and output coupled respectively to the output of the pulse width normalizing circuit 5 and the input of the electrical-to-optical transducer 3b, may comprise, as shown in the figure, a microcomputer which includes a serial I/O (input/output) for receiving and transmitting data, a CPU (central processing unit), a register, a ROM (read-only memory), a RAM (random access memory) and an I/O (input/output) port. The terminal electronic data processing device 6 receives and decodes the signal transmitted from other stations via the optical data transmission lines 1a and 1b; further, it transmits various data (pulse signals) to other stations via the electrical-to-optical transducer 3b and through the optical data transmission lines 1a and 1b.

The method of operation of the optoelectronic device of FIG. 2 can now be easily comprehended. An optical pulse signal transmitted from another station via one of the two optical data transmission lines 1a and 1b passes through the pass-through optical fiber ab to be directly injected into the other one of the two lines 1a and 1b; at the same time, it is guided, via the receiving optical fiber Ar or Br, to the optical to-electrical transducer 3a, to be converted therein to a corresponding electrical pulse signal. The pulse width of this electrical pulse signal may be varied due, for example, to the propagation delay of the optical pulse signal; however, the pulse width fixing circuit 4 generates pulses of predetermined fixed width, irrespective of the pulse widths of the received pulse signals. The electrical pulse signal which is thus regenerated by the pulse width fixing circuit 4 is again converted by the electrical-to-optical transducer 3b into a corresponding optical pulse signal, to be injected, via the transmitting optical fibers At and Bt, into the optical data transmission lines 1a and 1b, thereby being transmitted therethrough in both directions.

Further, the electrical pulse signal outputted from the optical-to electrical transducer 3a is inputted to the pulse width normalizing circuit 5, which converts it into an electrical pulse signal whose pulse width is equal to that utilized in the conventional electrical communication systems involving the terminal electronic data processing device 6. The output of the pulse width normalizing circuit 5 is inputted to the terminal device 6.

On the other hand, the electrical pulse signal outputted from the terminal electronic data processing device 6 is converted by the electrical-to-optical transducer 3b into a corresponding optical signal, to be transmitted in both directions via the transmitting optical fibers At and Bt and through the optical data transmission lines 1a and 1b.

Let us now describe the method of operation of an optical communication system comprising a plurality of optoelectronic devices similar to that shown in FIG. 2. FIG. 3 (c) shows a portion of such a communication system, wherein three stations (i.e., optoelectronic devices each provided with a terminal electronic data processing device associated therewith) X, Y, and Z, each having an organization similar to that shown in FIG. 2, are disposed along an optical data transmission line 1. Let us assume that a pulse signal (serial digital signal) of a pulse width $t_1$, as represented by the waveform at the top row in FIG. 3 (b), is generated in the terminal electronic data processing device 6x of station X; then it is converted into a corresponding optical pulse signal by the electrical-to-optical transducer of the optoelectronic device 11x, to be transmitted therefrom to stations Y and Z. Let us further assume that the propagation delay time between the stations X and Y is equal to $t_2$ and that between stations Y and Z equal to $t_3$. Then, as shown by the waveform at the third row in FIG. 3 (b), the optical pulse signal received at station Y is delayed by the propagation delay time $t_2$ between stations X and Y; the pulse signal received at the station Z, on the other hand, is further delayed therefrom by a propagation delay time $t_3$ between stations Y and Z, as represented by the waveform at the bottom row in FIG. 3 (b).

On receiving these pulse signals, the stations Y and Z regenerate the pulse signals by means of the pulse width fixing circuits 4y and 4z thereof, respectively, and transmit the thus regenerated pulse signals of a predetermined fixed pulse width $t_5$ therefrom; the waveforms of the pulse signals transmitted from stations Y and Z are represented at the second and the fourth row, respectively, in FIG. 3 (b). To explain this more specifically, the pulse width fixing circuits 4y and 4z are triggered to the high level at each leading edge of the pulses received at stations Y and Z, respectively; they return each time to the low level after a predetermined fixed length of time $t_5$ determined by the values of the capacitor and the resistance within the pulse width fixing circuits 4y and 4z.

According to the principle of this invention, the predetermined fixed time length (i.e., the pulse width of the regenerated pulse signals) $t_5$ is selected at a length which is shorter than the pulse width of the original pulse width $t_1$; the exact magnitude of the regenerated pulse width $t_5$ is determined on the basis of the original pulse width $t_1$ and the propagation delay times $t_2$, $t_3$, - - -, between the stations X and Y, stations Y and Z, etc., of the optical communication system. The reason for this is as follows:

According to this invention, not only the original signals generated by the terminal data processing devices 6x, 6y, 6z, etc., but also the regenerated signals (i.e., the signals regenerated and amplified by the pulse width fixing circuits 4x, 4y, 4z, etc.) are transmitted in both directions along the data transmission line or network 1. Thus, if the pulse widths of the original and the regenerated pulse signals are equal to each other, an adverse effect is produced due to the reflection of the optical signals between the stations.

Let us describe this situation in reference to FIG. 3 (a), wherein the waveform of the pulse signal (serial digital signal) originally generated by the terminal device $6x$ of station X is represented at the top. Let us assume that the pulse width $t_5$ of the regenerated signals is equal to the original pulse width $t_1$, and see what will result from the reflection of the signals. For simplicity's sake, we concentrate our attention to the signal flow between the stations X and Y. When an electrical pulse signal shown at the top row in FIG. 3 (a) is generated by the terminal device $6x$ of station X, this signal is converted into a corresponding optical signal, to be transmitted in both directions through the optical data transmission network 1. The adjacent station Y receives this optical pulse signal after a propagation delay time $t_2$; in response to the leading edge of the received pulse signal, the pulse width fixing circuit $4y$ of station Y is triggered to the high level, as shown by the waveform at the middle row in FIG. 3 (a). The pulse signal thus amplified and regenerated by the pulse width fixing circuit $4y$ at station Y is transmitted back to station X with an additional propagation delay $t_2$ from the station Y to station X. Thus, even after the time length equal to the original pulse width $t_1$ of the electrical pulse signal generated by the terminal device $6x$ passes after the leading edge of the first pulse thereof, to reduce again to the lower level the output of the terminal device $6x$, the signal received at station X from station Y remains at the high level due to the propagation delay time between the two stations X and Y; station X regenerates the received signal and hence continues to output the high level optical signal therefrom even after the passage of the time length $t_1$ from the leading edge of the first, original pulse. Thus, station Y receives a continuously high level signal, and hence becomes incapable of receiving the original pulse signal as represented at the top of FIG. 3 (a). In a similar manner, station Z also becomes incapable of receiving the original signal.

According to this invention, however, the pulse width $t_5$ is determined on the basis of the propagation delay times $t_2$ and $t_3$ between the stations X and Y and stations Y and Z, etc.; to take the propagation delay time $t_2$ between the stations X and Y as an example the pulse width $t_5$ is determined in accordance with the following considerations: before the time at which the level of the pulse signal originally generated by the terminal device $6x$ of station X returns from the high to the low level after the length of time equal to the original pulse width $t_1$, the signal regenerated by station Y and received at station X (with a double propagation delay time $2t_2$) returns to the low level Similar considerations apply to the reflection of the signal between stations X and Z etc. In this manner, signal transmission prohibition time $t_4$ (see FIG. 3 (b)) during which no regenerated pulse is transmitted via the optical data transmission lines is provided by means of the pulse width fixing circuits $4x$, $4y$, and $4z$, to ensure accurate and reliable transmission of the pulse signals through the optical communication system.

Referring next to FIGS. 4 through 7 of the drawings, let us describe an embodiment wherein the number of the optical data transmission lines that are to be coupled with each other by means of the optoelectronic device is three.

Figure 4:
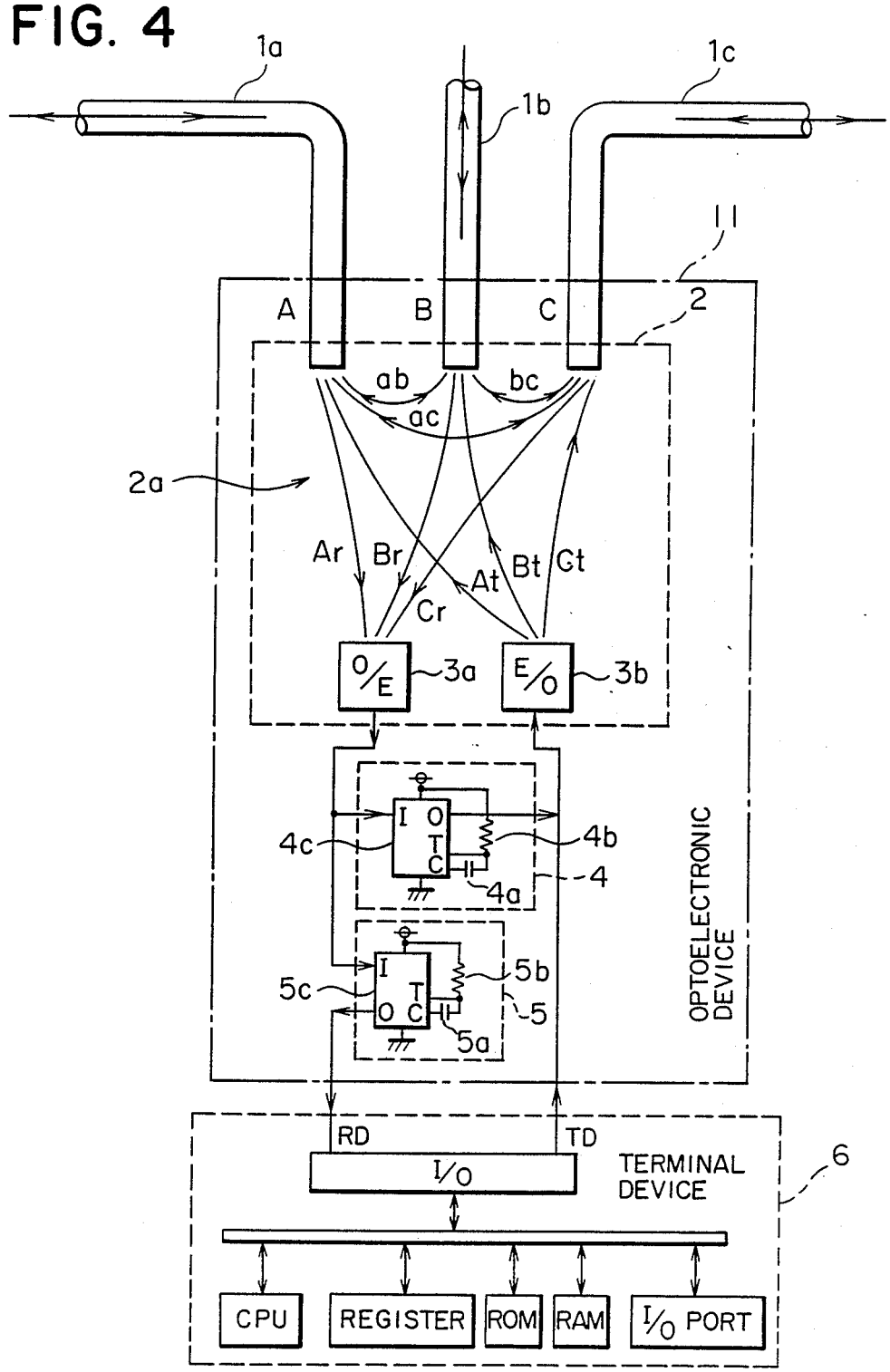
FIG. 4 is a view similar to that of FIG. 2, but showing another embodiment of the optoelectronic device according to this invention wherein the number of the optical data transmission lines that are to be coupled to each other by the optoelectronic device is three.

The overall organization of the embodiment is shown in FIG. 4, wherein three optical data transmission lines $1a$, $1b$, and $1c$, having three connector rod portions coupled to the connector sockets A, B, and C of the optoelectronic device 11, respectively, are each coupled, at another end thereof, to another adjacent optoelectronic device or station (not shown in the figure); the three optical data transmission lines $1a$, $1b$, and $1c$ each consist of a single optical fiber. As in the case described above wherein the number of the data transmission lines that are to be coupled to each other is two, the optoelectronic device 11 according to this embodiment of the invention comprises an optoelectronic coupler unit 2, a first pulse width fixing circuit 4, and a second pulse width fixing circuit (a pulse width normalizing circuit) 5. A terminal electronic data processing device 6, comprising a microcomputer, is coupled to the optoelectronic device 11. As in the above case, the optoelectronic coupler unit 2 comprises the optical coupler portion $2a$ and the optoelectronic transducer portion consisting of optical-to-electrical transducer $3a$ and the electrical-to-optical transducer $3b$. Except for the optical coupler portion $2a$ of the optoelectronic coupler unit 2, all other units, circuits, or devices $3a$, $3b$, 4, 5, and 6 have an organization and method of operation similar to the above device described in reference to FIG. 2; thus, the description thereof are not repeated here.

On the other hand, the optical coupler portion $2a$ of the optical coupler unit 2 is organized as follows. Three pass-through optical fibers ab, bc, and ac, each consisting of a single optical fiber of a smaller diameter that of the optical data transmission lines $1a$, $1b$, and $1c$, optically couple to each other at the connector sockets A, B, and C the three ports of the optical data transmission lines $1a$, $1b$, and $1c$. More specifically, the pass-through optical fiber ab couple at the connector sockets A and B the ports of the optical data transmission lines $1a$ and $1b$ to each other; the fiber bc couple at the connectors B and C the ports of the lines $1b$ and $1c$ to each other; and the fiber ac couple at the connectors A and C the ports of the lines $1a$ and $1c$ to each other. Further, three receiving optical fibers Ar, Br, and Cr for the reception of data couple to the input of the optical-to-electrical transducer $3a$ the ports of the optical data transmission lines $1a$, $1b$, and $1c$, respectively. On the other hand, three transmitting optical fibers At, Bt, and Ct couple the output of the electrical-to-optical transducer $3b$ to the ports of the optical data transmission lines $1a$, $1b$, and $1c$, respectively. Each one of these receiving and transmitting optical fibers also consists of a single optical fiber of a smaller diameter than that of the optical data transmission lines $1a$, $1b$, and $1c$. Thus, the port of the optical data transmission line $1a$, for example, forks into and is coupled to four thin optical fibers ab, ac, At, and Ar, as shown diagramatically in FIG. 6. The ports of the lines $1b$ and $1c$ are also divided into and coupled to four thin optical fibers of the optical coupler portion $2a$, respectively.

Figure 5:
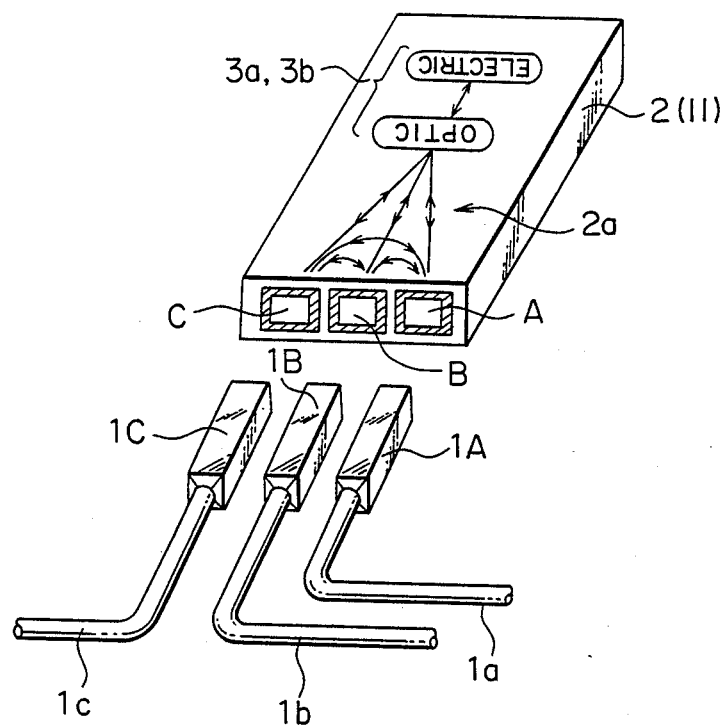
FIG. 5 is a perspective view of an optoelectronic coupler of FIG. 4.
Figure 6:
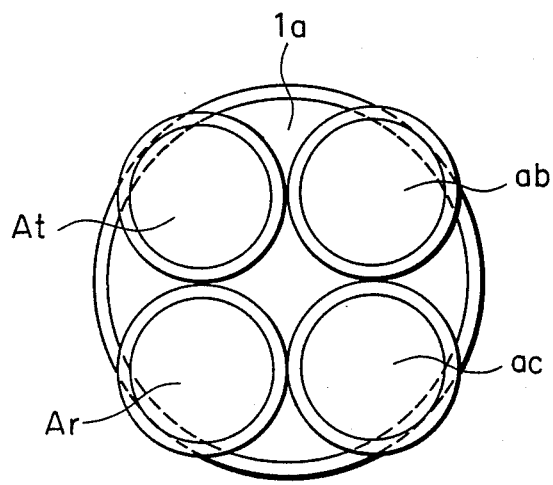
FIG. 6 is a diagramatic sectional view of a data transmission line optically coupled to four optical fibers constituting the pass-through and the receiving and the transmitting optical coupler means of the optoelectronic device of FIG. 4.

The optoelectronic coupler unit 2 (or the whole optoelectronic device 11) of FIG. 4 may have a box-shaped outward appearance as shown in FIG. 5, wherein the optical fibers of the optical coupler unit $2a$ and the optoelectronic transducers (i.e., the optical-to-electrical transducer $3a$ and the electrical-to-optical transducer $3b$) are schematically and graphically represented on the upper surface thereof As shown in FIG. 5, the box structure which accommodates the optoelectronic coupler unit 2 may be provided with connector sockets A, B, and C for receiving the rectangular prism-shaped connector rod portions 1A, 1B, and 1C of the optical data transmission lines 1a, 1b, and 1c, respectively.

The method of operation of the optoelectronic device 11 is similar to that of FIG. 2. Thus, when an optical signal is transmitted via one of the three optical data transmission lines 1a, 1b, and 1c (e.g. via the optical data transmission line 1a), the pass-through optical fibers ab, bc, and ac inject it directly into the other two optical data transmission lines (e.g. to the lines 1b and 1c), to transmit it therethrough. At the same time, the extracted optical signal is supplied, via one of the three receiving optical fibers Ar, Br, and Cr (e.g. the optical fiber Ar), to the optical-to-electrical transducer 3a, which converts the optical pulse signal into a corresponding electrical pulse signal. Further, the electrical output signal of a predetermined fixed pulse width regenerated by the pulse width fixing circuit 4 is converted by the electrical-to optical transducer 3b into an optical pulse signal corresponding thereto, which is injected into the three optical data transmission lines 1a, 1b, and 1c, so that the regenerated optical signal may be transmitted all the three optical data transmission lines 1a, 1b, and 1c. The method of operation of the circuits 4 and 5 and that of the terminal electronic data processing device 6 are the same as in the case of the device of FIG. 2.

Figure 7:
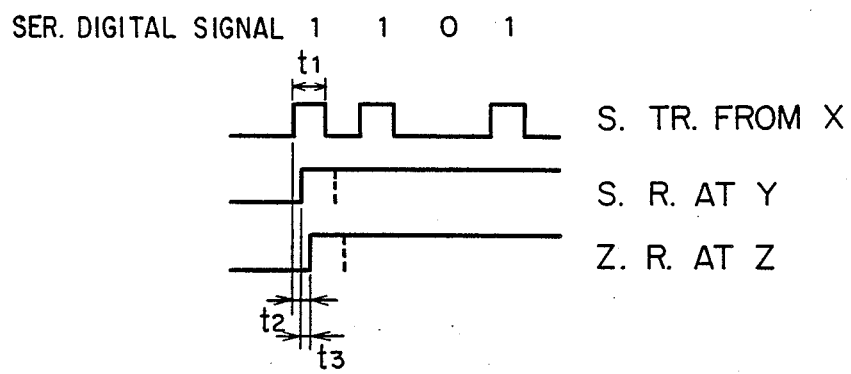
FIGS. 7 shows, together with an optical communication system including a plurality of the optoelectronic devices similar to that of FIG. 4, the actual and imaginary waveforms of the signals generated in the optical communication system, wherein FIG. 3 (a) shows the organization of a portion of the optical communication system, (b) shows imaginary waveforms which may produced if the width of the pulses regenerated by the optoelectronic devices are equal to the width of the original pulses, and (c) shows the waveforms that are actually generated.
Figure 7:
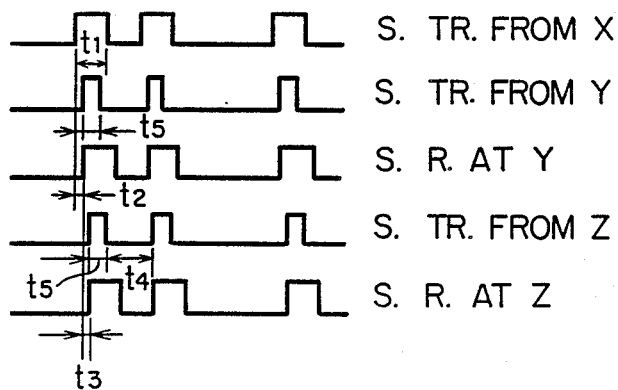

The method of operation of an optical communication system comprising the optoelectronic devices of FIG. 4 is thus similar to the case explained above in reference to FIG. 3, except for the obvious difference that each one of the optoelectronic devices 11 is coupled to three optical data transmission lines, instead of two. Namely, as shown in FIG. 7 (a) which shows a portion of an optical communication system comprising the optoelectronic devices similar to that of FIG. 4, each optoelectronic device is coupled to three respective data transmission lines. For example, the optoelectronic device 11x at station X is coupled to the optical data transmission line 1a, 1b, and 1c; the optoelectronic device 11y at station Y is coupled to the lines 1c, 1d, and 1e; and the optoelectronic device 11z at station Z is coupled to the lines 1e, 1f, and 1g. Thus, the pulse signal originally generated by the terminal electronic data processing device 6x of station X, for example, is transmitted, via the optoelectronic device 11x, in three directions through the three data transmission lines 1a, 1b, and 1c; further, the optical signal thus received at station Y via the data transmission line 1c from station X and regenerated by the optoelectronic device 11y of station Y is again transmitted in three directions via the data transmission lines 1c, 1d, and 1e. Otherwise the method of operation of the optical communication system, shown in FIG. 7 (a), comprising the optoelectronic devices similar to that of FIG. 4 is similar to the method of operation of the system comprising the devices similar to that of FIG. 2; thus, FIG. 7 (b) and (c) represent identical waveforms as represented in FIG. 3 (a) and (b), respectively. Hence, the description of the method of operation of the optical communication system of FIG. 7 (a) is not repeated here. It is noted in this connection that the pulse width $t_5$ of the regenerated pulses outputted from the pulse width fixing circuit 4 is selected at a length smaller than the pulse with $t_1$ of the original pulses outputted from the terminal electronic data processing device 6; this is necessary to avoid the adverse effects that may result from the reflection of the optical signals between the stations along the optical data transmission lines.

Referring next to FIGS. 8 through 11 of the drawings, let us describe applications of the optical communication system which comprises the optoelectronic devices according to this invention. Although all optical communication systems described below comprise the optoelectronic devices of the type shown in FIG. 4, it will be apparent to those skilled in the art that the optical communication system may comprise the optoelectronic devices of the type shown in FIG. 2.

Figure 8:
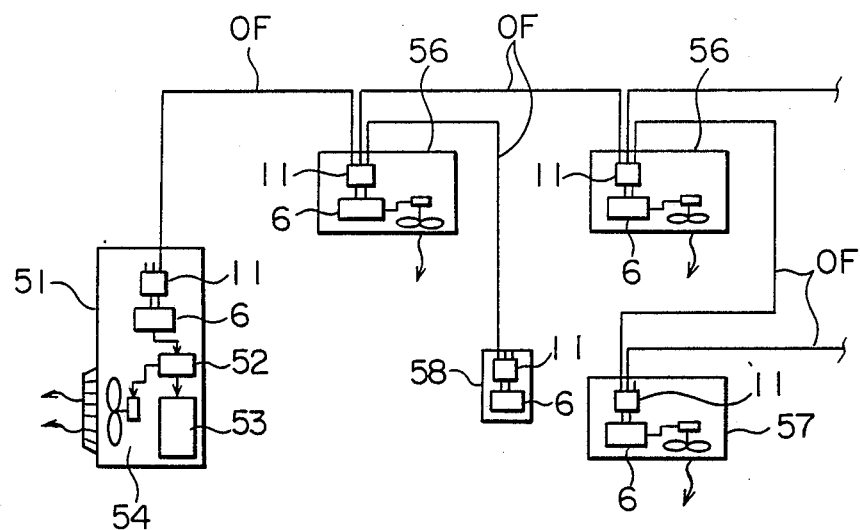
FIG. 8 is a schematic diagram showing the organization of an air-conditioning system incorporating an optical communication system according to this invention.

FIG. 8 shows the case in which the optoelectronic devices according to this invention are utilized in the optical communication system for an air-conditioning system. An outdoor unit 51 of the air conditioner system comprises an optoelectronic device 11 according to this invention and a terminal communication device 6 coupled thereto; further, an inverter variable-speed motor control unit 52 coupled to the terminal device 6 controls the operations of the compressor 53 and the fan 54. The respective indoor units 55, 56, and 57 and the remote control device 58 each comprise a small-sized optoelectronic device 11 therein; these optoelectronic devices 11 are coupled to each other via the optical fibers (optical data transmission lines) OF to effect data transmission through a furcate multiple bus network. Thus, the terminal electronic devices 6 of the outdoor and indoor units can be coupled to each other via the optical fibers OF without any modification of the conventional electrical communication protocol.

Figure 9:
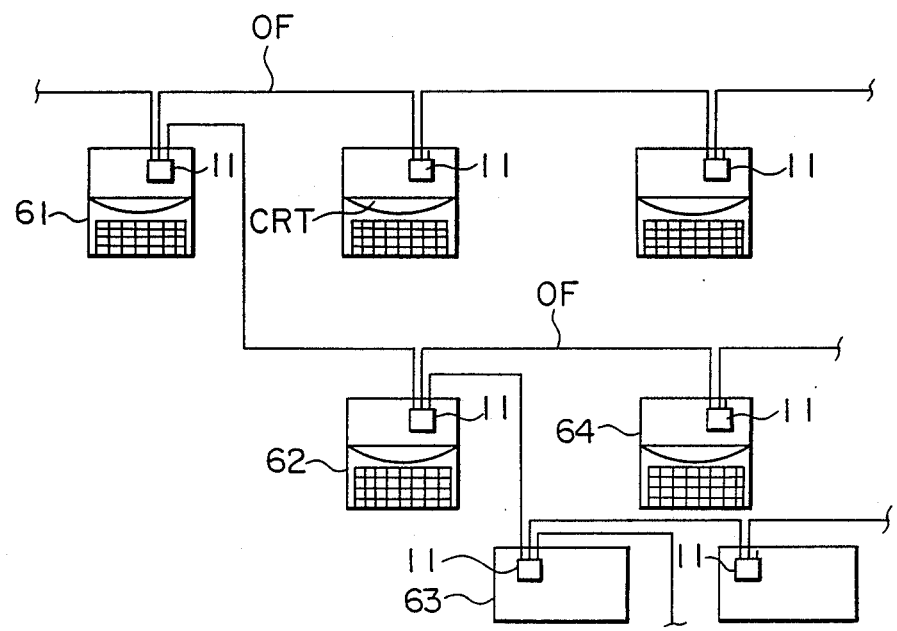
FIG. 9 is a schematic diagram showing an organization of a small-sized computer network incorporating an optical communication system according to this invention.

FIG. 9, on the other hand, show the case in which a plurality of small-sized computers (so-called personal computers) and FA (fully automatic) controllers (or sequencer) are coupled with each other by an optical communication system comprising the optoelectronic device according to this invention. The computers 61, 62, and 64, etc., and the sequencers 63 each comprise therein an optoelectronic device 11 according to this invention (the terminal devices 6 coupled to the respective optoelectronic devices 11 are omitted in FIG. 9, as in FIGS. 10 and 11, the description of which follows). In order to explain the operation of the system, let us discuss the case wherein an optical signal is to be transmitted from a computer 61 to another computer 64, etc.; then, even if the electronic portion of optoelectronic device 11 within the computer 62 fails, the optical signal is transmitted via the pass-through optical fibers (corresponding to the optical fibers ab, bc, and ac in FIG. 4) therein to reach the sequencer 63 and the computer 64. Thus, the optical communication network is highly reliable; further, even if there are sources of electromagnetic noises in the neighborhood, the communication can be effected via the optical data transmission lines without any chance of malfunctioning.

Figure 10:
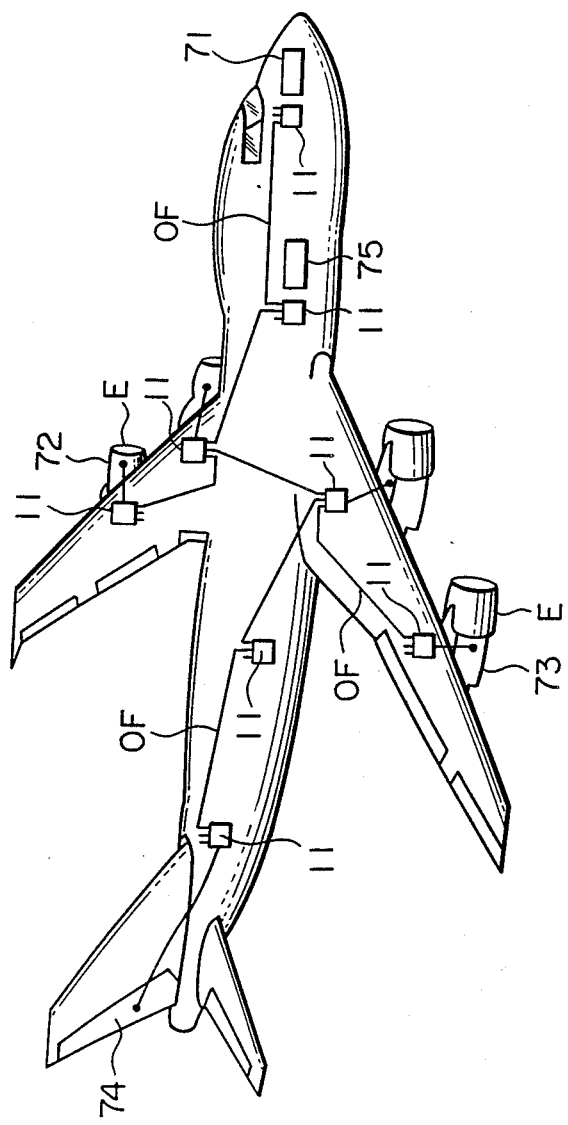
FIG. 10 is a schematic diagram of a transportation aircraft utilizing an optical communication system according to this invention as its control network.

Further, FIG. 10 shows a case in which the optical communication system is applied to a large aircraft for transportation. As shown in the figure, the optoelectronic devices 11 of the multiple bus type communication system according to this invention are disposed at the respective control units of the major equipment, to be coupled with each other via the optical fibers (optical data transmission lines) OF. Thus, the control information data can be transmitted, under the monitoring via the operation control unit 71, between the display unit 75 for the stewardess services, the control units 72 and 73 for the left and right engines E, and the control unit 74 for the empennage.

Aircrafts that are provided with engines of high output power comprise many sources of electromagnetic noises; thus, if the control units of major equipment are coupled with each other via electrical coaxial cables to effect the multiple bus type communication, the additions of the circuits for the noise guard, etc., that are thereby necessitated, entail much cost. The so-called FBL (fly by light) optical communication system according to this invention eliminates the danger of adverse effects of the electromagnetic noises; in addition, the communication protocol of the conventional electrical multiple bus type serial communication system can be utilized without modifications of the control units of the aircraft; furthermore, even if one of the optoelectronic devices 11 fails electronically, the whole communication network functions properly provided that two consecutive stations (optoelectronic devices) do not fail simultaneously.

Figure 11:
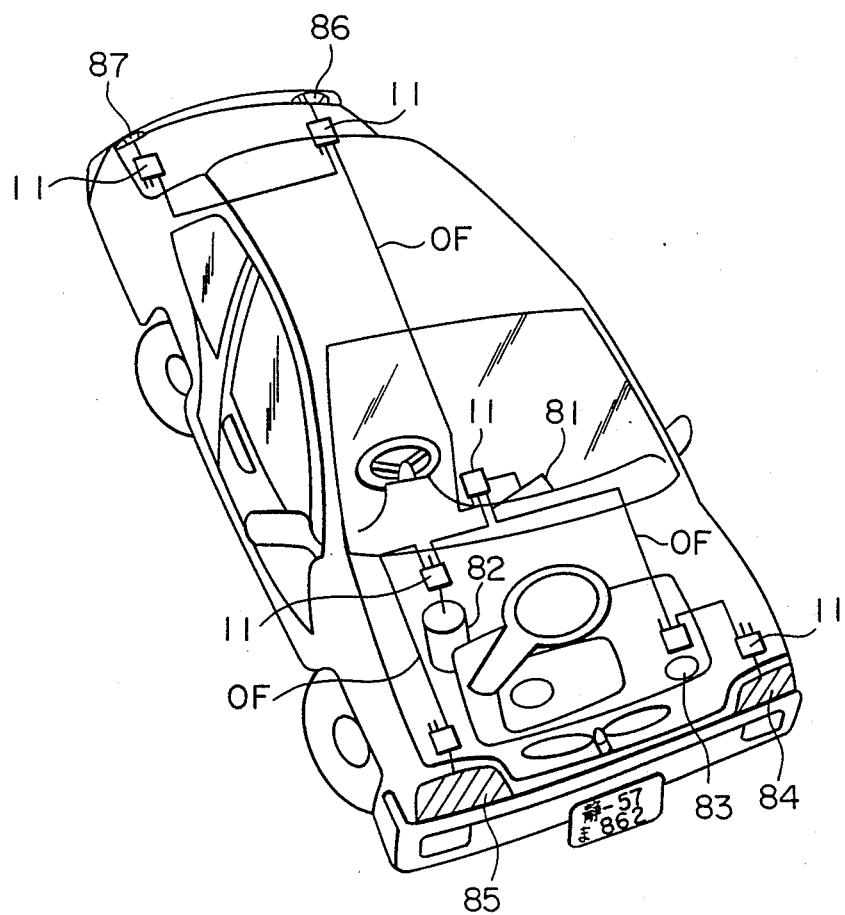
FIG. 11 is a schematic diagram of a automotive vehicle utilizing an optical communication system according to this invention as its control network.

FIG. 11 shows a case in which the optical communication system according to this invention is applied to the control system of an automobile. This application is similar to that to the aircraft described above. As shown in the figure, optoelectronic devices 11 according to this invention are disposed, for example, at the following units of the equipment: engine revolution indicator 81, engine revolution detector 83, distributor 82, controllers 84 and 85 for the left and right headlights, and controllers 86 and 87 for energizing the left and right rear winkers; the optoelectronic devices 11 at these units of equipment are coupled to each other via the optical fibers (optical data transmission lines) OF to effect the serial multiple bus type communication of data and control signals between these units. Thus, the multitude of the electrical wiring which was necessary in the conventional electrical communication system therebetween can be dispensed with; further, the optical communication system is immune to the electromagnetic noises that are generated near the engine. The optical communication system according to this invention can be implemented in a small space and at a low cost.

In the above, the particular embodiments of this invention have been described; however, it will be apparent to those skilled in the art that many modifications may be made without departing from the spirit thereof. In this connection, the following points may be noted:

The number of the optical data transmission lines that are to be coupled with each other by an optoelectronic device according to this invention may be more than three, instead of two or three. If, for example, four optical data transmission lines 1a, 1b, 1c, and 1d are to be coupled with each other by means of the optoelectronic device, optical coupler portion 2a of the optoelectronic coupler unit 2 should comprise the following: six pass-through optical fibers ab, ac, ad, bc bd, and cd which couple to each other, respectively, the two ports of optical data transmission lines 1a and 1b, those of the lines 1a and 1c, those of the lines 1a and 1d, those of the lines 1b and 1c, those of the lines 1b and 1c, and those of the lines 1c and 1d; four receiving optical fibers Ar Br, Cr, and Dr which couple the four ports of the four optical data transmission lines 1a, 1b, 1c, and 1d, respectively, to the input of the optical-to electrical transducer 3a; and four transmitting optical fibers At, Bt, Ct, and Dt which couple the output of the electrical-to-optical optical transducer 3b to the four ports of the four optical data transmission lines 1a, 1b, 1c, and 1d, respectively. Otherwise, the organization and method of operation of such an optoelectronic device 11 or those of the optical communication system comprising such optoelectronic devices are similar to the case described above.

Further, the pulse width fixing function of the optoelectronic device may be accomplished by a means that fixes (or normalizes) the width of the intermittent pulses by effecting a high frequency modulation thereon within the transmission pulse width of the conventional electrical NRZ (non-return to-zero) serial communication system.

Thus, the appended claims are contemplated to cover any such modifications as fall within the true spirit and scope of this invention.

What is claimed is:

1. An optoelectronic device for connecting to each other ports of a plurality of bidirectional optical data transmission lines of an optical communication system which includes signal generator means for generating optical pulse signals that are transmitted through the optical data transmission lines said optoelectronic device comprising:

pass-through optical coupler means for optically connecting ports of a plurality of optical data transmission lines of said optical communication system to each other, said pass-through optical coupler means including optical fiber means connecting said ports of the optical transmission lines to each other;

optical-to-electrical transducer means for converting optical pulses into corresponding electrical pulses;

receiving optical coupler means for optically connecting said ports of the optical data transmission lines to an input of said optical-to-electrical transducer means, to supply to said optical-to-electrical transducer means said optical pulse signals that are generated by said signal generator means, transmitted through the optical data transmission lines, and outputted from said ports of the data optical transmission lines, said receiving optical coupler means including optical fiber means connecting said ports of the optical data transmission lines to the input of the optical-to-electrical transducer means;

electrical-to-optical transducer means for converting electrical pulses into corresponding optical pulses;

transmitting optical coupler means for optically connecting an output of said electrical-to-optical transducer means to said ports of the optical data transmission lines, to inject into said ports of the optical transmission lines optical pulse signals outputted from said electrical-to-optical transducer means, said transmitting optical coupler means including optical fiber means connecting the output of said electrical-to-optical transducer means to said ports of the optical transmission lines; and first pulse width fixing means having an input and an output electrically coupled, respectively, to an output of said optical-to-electrical transducer means and to an input of said electrical-to-optical transducer means, for producing electrical pulses of a first predetermined fixed width in response to electrical pulses supplied thereto from said optical-to-electrical transducer means, wherein said first predetermined fixed width of the pulses produced by the first pulse width fixing means is smaller than a pulse width of said optical pulse signals that are generated by said signal generator means and transmitted through the optical data transmission lines.

2. An optoelectronic device as claimed in claim 1, further comprising:
   second pulse width fixing means, having an input electrically coupled to the output of said optical-to-electrical transducer means, for producing electrical pulses of a second predetermined fixed width in response to electrical pulses supplied thereto; and
   terminal electronic data processing means, having an input and an output electrically coupled, respectively, to an output of said second pulse width fixing means and to the input of said electrical-to-optical transducer means, for receiving information data contained in said optical pulse signals transmitted through the optical data transmission lines, via the electrical pulses supplied thereto from said second pulse width fixing means, and for outputting to said electrical-to-optical transducer means electrical pulse signals whose pulse width is greater than said first predetermined fixed width.

3. An optoelectronic device as claimed in claim 2, wherein said signal generator means of the optical communication system comprises said terminal electronic data processing means, and the pulse width of said electrical pulse signals outputted from said terminal electronic data processing means is equal to the pulse width of the optical pulse signals that are generated by the signal generator means and transmitted through the optical data transmission lines.

4. An optoelectronic device as claimed in claim 2, wherein said terminal electronic data processing means comprises a microcomputer.

5. An optoelectronic device as claimed in claim 2, wherein said first and second pulse width fixing means each comprise a monostable multivibrator.

6. An optoelectronic device as claimed in claim 1, wherein said first pulse width fixing means comprises a monostable multivibrator.

7. A multi-drop type optical communication system comprising a plurality of optoelectronic devices as claimed in claim 1 disposed along optical data transmission lines thereof, wherein the optoelectronic devices are optically coupled to each other by means of the optical data transmission lines.

8. An optoelectronic device for connecting to each other two ports of two bidirectional optical data transmission lines of an optical communication system which includes signal generator means for generating optical pulse signals that are transmitted through the optical data transmission lines, said optoelectronic device comprising:
   pass-through optical coupler means for optically connecting two ports of two optical data transmission lines of said optical communication system to each other, said pass-through optical coupler means including optical fiber means connecting said two ports of the two optical data transmission lines to each other;
   optical-to-electrical transducer means for converting optical pulses into corresponding electrical pulses;
   receiving optical coupler means for optically connecting said two ports of the two optical data transmission lines to an input of said optical to-electrical transducer means, to supply to said optical to-electrical transducer means said optical pulse signals that are generated by said signal generator means, transmitted through the optical data transmission lines, and outputted from said two ports of the two optical transmission lines, said receiving optical coupler means including optical fiber means connecting said two ports of the two optical data transmission lines to the input of the optical-to-electrical transducer means;
   electrical-to-optical transducer means for converting electrical pulses into corresponding optical pulses;
   transmitting optical coupler means for optically connecting an output of said electrical-to-optical transducer means to said two ports of the two optical data transmission lines, to supply to said ports of the optical data transmission lines optical pulse signals outputted from said electrical-to-optical transducer means, said transmitting optical coupler means including optical fiber means connecting the output of said electrical-to-optical transducer means to said two ports of the two optical data transmission lines; and
   first pulse width fixing means having an input and an output electrically coupled, respectively, to an output of said optical-to-electrical transducer means and to an input of said electrical-to-optical transducer means, for producing electrical pulses of a first predetermined fixed width in response to electrical pulses supplied thereto from said optical-to-electrical transducer means, wherein said first predetermined fixed width of the pulses produced by the first pulse width fixing means is smaller than a pulse width of said optical pulse signals that are generated by said signal generator means and transmitted through the optical data transmission lines.

9. An optoelectronic device for connecting to each other ports of three optical data transmission lines of an optical communication system which includes signal generator means for generating optical pulse signals that are transmitted through the optical data transmission lines, said optoelectronic device comprising:
   pass-through optical coupler means for optically connecting three ports of the three optical data transmission lines of said optical communication system to each other, said pass-through optical coupler means including optical fiber means connecting said three ports of the optical data transmission lines to each other;
   optical-to-electrical transducer means for converting optical pulses into corresponding electrical pulses;
   receiving optical coupler means for optically connecting said three ports of the three optical data transmission lines to an input of said optical-to-electrical transducer means, to supply to said optical-to-electrical transducer means said optical pulse signals that are generated by said signal generator means, transmitted through the optical data transmission lines, and outputted from said ports of the optical data transmission lines, said receiving optical coupler means including optical fiber means connecting said ports of the optical data transmission lines to the input of the optical-to-electrical transducer means;
   electrical-to-optical transducer means for converting electrical pulses into corresponding optical pulses;
   transmitting optical coupler means for optically connecting an output of said electrical-to-optical transducer means to said three ports of the three optical data transmission lines, to supply to said three ports of the three optical data transmission lines optical pulse signals outputted from said electrical-to optical transducer means, said transmitting optical coupler means including optical fiber means connecting the output of said electrical-to-optical transducer means to said three ports of the three optical data transmission lines; and first pulse width fixing means having an input and an output electrically coupled, respectively, to an output of said optical-to-electrical transducer means and to an input of said electrical-to-optical transducer means, for producing electrical pulses of a first predetermined fixed width in response to electrical pulses supplied thereto from said optical-to-electrical transducer means, wherein said first predetermined fixed width of the pulses produced by the first pulse width fixing means is smaller than a pulse width of said optical pulse signals that are generated by said signal generator means and transmitted through the optical data transmission lines.

10. An optoelectronic device as claimed in claim 8 or 9, further comprising:

second pulse width fixing means, having an input electrically coupled to the output of said optical-to-electrical transducer means, for producing electrical pulses of a second predetermined fixed width in response to electrical pulses supplied thereto; and terminal electronic data processing means, having an input and an output electrically coupled, respectively, to an output of said second pulse width fixing means and to the input of said electrical-to-optical transducer means, for receiving information data contained in said optical pulse signals transmitted through the optical data transmission lines, via the electrical pulses supplied thereto from said second pulse width fixing means, and for outputting to said electrical to optical transducer means electrical pulse signals whose pulse width is greater than said first predetermined fixed width.

* * * * *